Nov. 24, 1936.    H. E. SIPE    2,061,680
SEPARABLE FASTENER
Filed Feb. 3, 1932
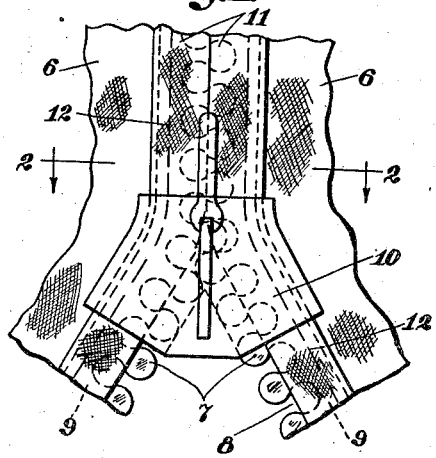
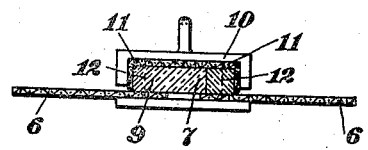
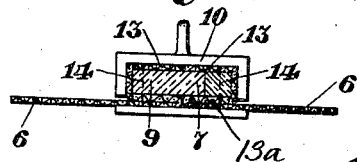
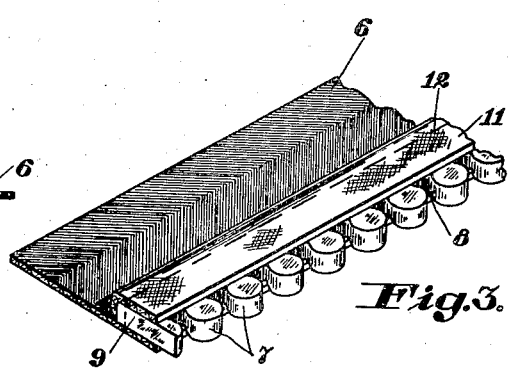
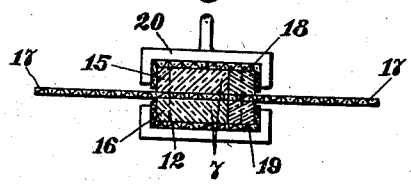
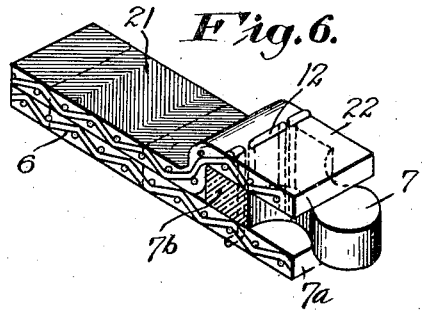
INVENTOR.
Harry E. Sipe
BY R. S. Kelley
ATTORNEY.

Patented Nov. 24, 1936

2,061,680

UNITED STATES PATENT OFFICE 2,061,680

SEPARABLE FASTENER

Harry E. Sipe, New York, N. Y., assignor to Hookless Fastener Company, a corporation of Pennsylvania Application February 3, 1932, Serial No. 590,656

12 Claims. (Cl. 24—205)

My invention relates to separable fasteners of the edgewise multiple interlocking type and the principal object of the present invention is to provide an improved flexible covering which shall be durable and strong and at the same time, not be objectionably bulky and which will be capable of easy attachment to the fastener. Preferably, these coverings are made of material having relatively high tensile strength, such as a woven silk fabric, so that the fastener is reinforced against transverse flexing strains. This reinforcing function is particularly advantageous in some types of fasteners which might be disengaged when bending on a sharp radius, for example, the fastener made of rubber or similar material illustrated in my Patent No. 1,719,856, dated July 9, 1929.

Other objects and advantages of the invention will appear to those skilled in the art upon reading the following specification.

In the accompanying drawing I have shown for purposes of illustration, the preferred form and a few alternative embodiments thereof which my invention may assume in practice. In this drawing:

Fig. 1 is a plan view showing a portion of a fastener having my improvement incorporated therewith;

Fig. 2 is a transverse section through the fastener of Fig. 1 on line 2—2;

Fig. 3 is a perspective view showing one side of the fastener of Fig. 1;

Fig. 4 is a transverse section showing an improved construction;

Fig. 5 is a similar section showing still another modification, and Figure 6 is an enlarged perspective view of a portion of still another modification, in Figure 3, showing a single interlocking element.

I have illustrated my invention as associated with a fastener similar to that disclosed in my above mentioned patent but it will be understood that the present invention is applicable to all fasteners of the multiple edgewise interlocking type, such as the fastener illustrated in the patent to Sundback 1,219,881, March 20, 1917.

This type of fastener usually comprises a pair of flexible supporting members or mounting strips such as fabric tapes 6, each having a row of suitable interlocking elements carried on its edge. As best shown in Figure 6, the interlocking elements may each include an interlocking portion or tooth 7 which projects beyond the edge 7a of the tape, and an anchoring portion or base 7b by which the element is secured or anchored to the tape. The interlocking teeth 7 are spaced at uniform intervals along each tape, leaving recesses 8 between them, as shown best in Figs. 1 and 3 to receive the corresponding teeth of the mating row, their base portions defining a marginal zone or area along the edge of the tape, within which zone the elements are secured to the tape. The interlocking elements may be formed of any suitable material, herein chosen for illustration as rubber. When the elements are made of rubber, the anchoring or base portions are preferably integrally joined thus forming an anchoring or supporting strip 9 for the whole row of elements. This facilitates spacing of the teeth 7 and simplifies attachment to the mounting strip 6. The interlocking element strips 9 can be attached to the mounting strips by cementing, stitching or in any other suitable manner. Herein they are shown as secured to the tapes by stitching 12 or 14. It is observed that the interlocking elements on both tapes have their upper side surfaces all disposed in a common plane which is spaced from the plane of the strips 6 by the thickness of the elements. A slider 10 is mounted to ride on the interlocking elements and serves to engage and disengage the elements during its travel from one end to the other of the fastener. The functioning of the slider 10 is fully described in either of the above mentioned patents and it need be merely stated here that the slider is formed with suitable channels of the appropriate shape and size for embracing the interlocking elements and covering strips and for guiding the elements into and out of engagement, and that the interlocking and disengagement is accomplished by movement of the elements within their common plane.

Heretofore attempts have been made to cover or conceal the interlocking elements of fasteners of this general type by sewing a pleat or strip of textile material either to the fastener or to the garment or article to be closed in such a manner that the strip was supposed to lie over or on top of the interlocking elements. In so doing it has been customary to sew the covering strip to the fabric by a line of stitching at some distance from the row of interlocking elements.

Being concerned with providing a more satisfactory covering for fasteners of this type, I accomplish one of the principal objects of my invention by securing the covering strip directly to or against the interlocking elements, for example by stitching the cover to the fabric strip within the area occupied on such fabric strip by the interlocking elements themselves.

The covering strips in Figs. 1, 2, and 3 are designated 11 and are attached to the fastener strips and mounting tapes 6 by one or more rows of stitching 12. These strips as above stated, are preferably of silk fabric but, of course, may be of leather, rubberized fabric or any other material having the desired properties.

The covering strips are attached against the side surfaces of the fastener elements and extend over them to such a point that when the fastener is closed, they will meet and substantially conceal the fastener elements. The covering strips may also extend out over the mounting tapes 6 if desired, as shown in Fig. 6.

In the form shown in Fig. 4, the cover strips 6 are doubled over and folded back around the fastener element strips to provide the covering extensions 13, each in the form of a zone or area of the cover strip which lies in a plane and is secured to the interlocking elements by stitching 14. The cover strip also includes the portion 13a secured against the tape 6 by the same stitching 14 which holds the entire assembly together. In Fig. 5 there are two sets of fastener strips 15 and 16 on opposite sides of the mounting strips 17 and the covering strips 18, 19 on opposite sides of the fastener are of a form similar to that shown in Figs. 1, 2, and 3. The slider 20 is made of appropriate shape to fit this design of fastener. In Fig. 6 the cover strip includes a portion 21 extending over the tape 6 in addition to the portion or zone 22 secured to the interlocking elements.

It will be observed that the cover strip is, in some modifications such as that in Fig. 4, secured directly to the tape 6, and that the cover strip in all modifications illustrated includes a portion or zone which is spaced away from the tape by the thickness of the portion of the fastener elements which project above the tape. This spaced portion or zone is caused to lie flat in a plane against the side surfaces of the interlocking elements by being secured firmly against the elements, in the examples shown, by the stitching. This results in a covering which completely conceals the fastener elements when the fastener is closed, and which inherently lies flat and does not wrinkle or bulge. In fact the cover strips are so flatly and securely attached to the fastener elements that they serve not only as covering for the sake of appearance but also as structural elements which fulfill the function of holding the fastener elements always in engagement even when the fastener is bent on a sharp radius.

As a result of my invention, it will be observed that the interlocking elements of fasteners of the above type may be concealed from view in articles where the appearance of the fastener elements would be objectionable. The color and material of the covering strips can be varied to suit the many articles in which the fastener may be used. The invention has the advantage over known devices intended for concealing the fastener in that it provides a much neater, more compact and more durable covering device.

While I have in this application specifically described one embodiment and several modifications which my invention may assume in practice, it will be understood that these embodiments and modifications are merely for the purposes of illustration and description and that various other forms may be devised within the scope of my invention as defined in the appended claims.

What I claim as my invention is:

1. A fastener comprising in combination a pair of flexible mounting members in the same plane, a row of interlocking elements secured to each member, each element including an anchoring portion and an interlocking portion, a slider for progressively engaging and disengaging the elements by movement of the elements in the same plane, and flexible covering strips in contact with and positively attached to the interlocking elements by stitches engaging said mounting members and interlocking elements, the covering strips extending closely adjacent and concealing the interlocking portions of the elements when the fastener is closed.

2. A fastener comprising in combination a pair of flexible mounting members in the same plane, a row of interlocking elements secured to each member, each element including an anchoring portion and an interlocking portion, a channeled slider for progressively engaging and disengaging the elements by movement of the elements in the same plane, and woven fabric covering strips in contact with the interlocking members, said strips being attached to the interlocking elements and to said mounting members, said slider embracing said cover strips so that the inner surface of the slider channel bears against said cover strips.

3. A fastener comprising in combination a pair of flexible mounting members in the same plane, a row of interlocking elements secured to each member, each element including an anchoring portion and an interlocking portion, a slider for progressively engaging and disengaging the elements by movement of the elements in the same plane, and thin flexible covering strips stitched to said mounting members, said strips overlapping and lying directly against the interlocking elements and being of sufficient width to conceal the interlocking portions of the elements when the fastener is closed, said slider embracing said covering strips.

4. A slide fastener comprising in combination, a pair of flexible supporting members, a row of interlocking elements secured to each member, said interlocking elements including anchoring portions and interlocking portions, the anchoring portions in each row being secured to a supporting member and defining a zone extending lengthwise thereof, both rows of elements being disposed in a common plane, a slider for progressively interlocking or separating the elements by movement of the elements in their common plane, and a flexible cover strip for each row of elements, said cover strip being positively secured against the side surfaces of the elements by stitches extending through the supporting member within said zone, and said cover strip extending over said interlocking portions.

5. A slide fastener comprising in combination, a pair of flexible supporting members, a row of interlocking elements secured to each member, said interlocking elements including anchoring portions and interlocking portions, both rows of elements being disposed in a common plane, a slider for progressively interlocking or separating the elements by movement of the elements in their common plane, and a flexible cover strip for each row of elements, each strip having a planar zone disposed against the side surfaces of the elements, said cover strip being secured to the elements by stitching to the supporting member within said zone and extending over said interlocking portions.

6. A slide fastener comprising in combination a pair of flexible supporting members each provided with a row of interlocking elements, said elements including anchoring portions secured to the member and defining a zone extending lengthwise thereof, each element also including an interlocking portion extending beyond the edge of the member, all of said elements being disposed in a common plane, a slide for progressively interlocking or separating the elements by movement of the elements in their common plane, and a flexible cover strip for each row of elements, each strip being secured against the side surfaces of the elements by stitching to the supporting member within the zone defined by the anchoring portions of the elements, said strips extending over the interlocking portions of the elements.

7. A slide fastener comprising in combination a pair of flexible supporting members, a row of interlocking elements secured to each member, each element having a side surface spaced from the supporting member and the side surfaces of all of the elements being disposed in a common plane, a slider for progressively interlocking or separating the elements by movement of the elements in their common plane, a flexible covering strip for each row of elements, said interlocking elements including spacing means between the supporting member and cover strip, said cover strip being stitched to the spacing means, the thickness of said spacing means being substantially equal to the distance between the supporting member and the side surfaces of the interlocking elements whereby the cover strip is held flat and against the side surfaces of the interlocking elements by the stitching.

8. A slide fastener comprising in combination a pair of flexible supporting members, a row of interlocking elements secured to each member, each element having a side surface spaced from the supporting member and the side surfaces of all of the elements being disposed in a common plane, a slider for progressively interlocking or separating the elements by movement of the elements in their common plane, a flexible covering strip for each row of elements, said interlocking elements including spacing means integral with the elements and located between the supporting member and cover strip, said cover strip being stitched to the spacing means, the thickness of said spacing means being substantially equal to the distance between the supporting member and the side surfaces of the interlocking elements whereby the cover strip is held flat and against the side surfaces of the interlocking elements by the stitching.

9. A slide fastener comprising in combination a pair of flexible supporting members, a row of interlocking elements secured to each member, each element including an anchoring portion and an interlocking portion, both rows of elements being disposed in a common plane, a flexible cover strip for each row of elements, said cover strip being positively secured against the side surfaces of the elements by stitching extending through the supporting member, and said cover strip extending over said interlocking portions, and a slider for progressively interlocking or separating the elements by movement of the elements in their common plane, the slider being disposed about the elements outside of the cover strip.

10. A slide fastener comprising in combination a pair of flexible supporting members, a row of interlocking elements secured to each member, each interlocking element having a side surface spaced from the supporting member and the side surfaces of all of the elements being disposed in a common plane, a slider for progressively interlocking or separating the elements by movement of the elements in their common plane, a flexible covering strip for each row of elements, said covering strip including a portion secured against the flexible supporting member and a portion spaced from the flexible supporting member and positively secured against the side surfaces of the elements by stitching passing through the flexible supporting member and said row of elements.

11. A slide fastener comprising in combination a pair of flexible supporting members, a row of interlocking elements secured to each member, said elements including anchoring portions secured to the member and defining a marginal zone thereon and interlocking portions extending beyond the edge of the member, the side surfaces of all of said elements being disposed in a common plane spaced from the plane of the supporting members, a slider for progressively interlocking or separating the elements by movement of the elements in their common plane, and a flexible cover strip for each row of elements, each strip having a portion secured against the corresponding supporting member and a portion spaced from the supporting member and secured against the side surfaces of the elements by stitching to the supporting member within the marginal zone defined by the anchoring portions of the elements.

12. A slide fastener comprising in combination a pair of flat supporting tapes arranged in the same plane, cooperating rows of fastener elements disposed wholly on one side of said tapes and attached to the side surfaces thereof by stitching passing through the supporting tapes and said rows of fastener elements, said tapes coming substantially into meeting relation so as to hide the fastener elements from view on one side.

HARRY E. SIPE.